April 25, 1950

J. ANDERSON, JR
MEANS FOR AND METHOD OF GROUPING
STORAGE BATTERY PLATES 2,505,514

Filed May 26, 1947

INVENTOR.
James Anderson Jr.
BY
Stuart M. Maule
ATTORNEY.

April 25, 1950

J. ANDERSON, JR
MEANS FOR AND METHOD OF GROUPING
STORAGE BATTERY PLATES 2,505,514

Filed May 26, 1947

INVENTOR.
James Anderson Jr.
BY
Stuart M. Maule
ATTORNEY.

April 25, 1950     J. ANDERSON, JR     2,505,514
MEANS FOR AND METHOD OF GROUPING
STORAGE BATTERY PLATES Filed May 26, 1947     4 Sheets-Sheet 3

INVENTOR.
James Anderson Jr.
BY
ATTORNEY.

April 25, 1950

J. ANDERSON, JR 2,505,514

MEANS FOR AND METHOD OF GROUPING
STORAGE BATTERY PLATES

Filed May 26, 1947

INVENTOR.
James Anderson Jr.
BY
ATTORNEY.

Patented Apr. 25, 1950

2,505,514

UNITED STATES PATENT OFFICE 2,505,514

MEANS FOR AND METHOD OF GROUPING STORAGE BATTERY PLATES

James Anderson, Jr., Los Angeles, Calif.

Application May 26, 1947, Serial No. 750,446

9 Claims. (Cl. 113—59)

This invention relates to machines for performing special work, and more particularly to machines for use in the manufacture of electric storage batteries.

An object of my invention is to provide a machine for use in the process of uniting storage battery grid plates and separators into assemblies ready for incorporation into storage battery cells.

A more detailed object of my invention is to provide a machine for the grouping together of negative and positive group assemblies after the positive and negative plates and separators have been deposited in a magazine which has been loaded either by hand or by a machine.

Up to the present time, practically all plate assembly units are produced by the hand method which requires an operator to pick up each individual positive plate and place it in a retaining rack which is called the "burning comb" since the process of uniting the groups of like plates is known in the trade as "burning." The negative plates have to be placed by hand in a similar rack for this purpose. After the plates of each desired group have been joined to the necessary terminal posts, it is necessary for the operator to withdraw the groups from the combs and nest each positive group within the corresponding negative group which, after the necessary separators have been inserted between each plate, will form a cell unit. This is a slow and laborious method because an operator has to handle from 90 to 102 plates to produce the cells required for two standard automobile batteries. The object of my machine is to be able to insert in the burning combs all of the plates necessary for two or more batteries in substantially the same length of time that it requires an operator to place a single plate in the burning combs according to the standard hand method. The actual uniting of the terminal posts with the plates in my machine is practically the same as in the hand method, except that after the burning has taken place, all the completed cells are withdrawn from the combs in one single movement of the machine. It is therefore another object of my invention to provide a method of assembling storage battery grid plates into positive and negative assemblies and for uniting those assemblies into cell units with the electrically-joined positive plates interposed between the electrically-joined negative plates and with the separators properly interposed between each two adjacent plates of unlike polarity.

A further object is to provide a battery plate uniting machine of the general class indicated which is adapted to receive a number of such plates sufficient for a plurality of plate assemblies and for retaining them rigidly and accurately in properly spaced-apart relation while the process of burning is performed, thus assuring a production of plate assemblies of proper over-all dimensions and wherein the plates are accurately spaced apart to meet the requirements of both manufacture and operation of the battery after its manufacture has been completed.

Another object of the invention is the provision of a battery plate group burning machine as described which is adapted to receive the plates to be assembled with the positive and negative grid plates arranged alternately with respect to each other and with the lugs of the positive and negative plates disposed, respectively, in two spaced-apart rows, thus permitting burning both the positive assemblies and the negative assemblies with a single setting of the machine and substantially by means of a single operation by the machine's operator with the result that upon completion of the burning process the respective positive and negative assemblies will be disposed with their plates and separators in proper relation with respect to each other to define a properly assembled storage battery cell unit.

A further object in this connection is the provision of a battery plate assembly machine provided with means for isolating, or shielding, the lug of each of a plurality of the positive plates, such positive plates so isolated being at predetermined spaced intervals throughout the stack of plates fed to the machine, with the result that when the burning process is carried out, these isolated plates will be left unattached to any of the assemblies, thus automatically providing for the well-known requirement that each storage battery cell unit must consist of one more negative plate than the number of positive plates in that cell unit.

A further object is to provide a machine for burning storage battery plates to form positive and negative plate assemblies wherein one of the plates of the positive assembly is disposed between each two adjacent plates of the negative assembly, as indicated hereinabove, and which also is adapted to receive the plates into the machine, ready for burning, with the requisite spacers of insulating material already interposed between each two adjacent plates, with the result that when the process of burning the plates together into the several assemblies has been completed, the battery cell units thus produced are ready for installation into the battery cells. In this manner, I am able to avoid the laborious and expensive process of inserting these spacers between the plates of previously burned plate assemblies, which at present is almost universally practiced in the manufacture of storage batteries as pointed out hereinabove, and which requires a considerable amount of pounding to force the separators home into proper operative relation with respect to their associated grid plates. This feature is particularly advantageous because it eliminates the hazard of damaging the readily frangible fiber glass retaining mats and wooden plates which in usual practice comprise the spacers between each two adjacent grid plates.

Another advantage gained in the manufacture of electric storage batteries by means of the method and machine of my invention is that they permit the arrangement of the positive and negative plates in proper sequence and in large numbers in containers, or magazines, capable of retaining the plates so arranged until they are later fed into the machine, with the result that the rate at which the plates are so assembled need not necessarily be synchronized accurately with the rate at which the operator performs the burning process. This permits a surplus of magazines to be accumulated, each containing the proper number of properly arranged plates, which magazines then can be fed through the burning machine of the present invention at the optimum rate as far as the efficiency of the operation of the burning machine is concerned. Hence, my invention is conducive to the most efficient use of labor in the production of storage batteries in that it makes the operation of the plate assemblying personnel and the operation of the burning personnel entirely independent of each other.

The invention possesses other objects and valuable features, some of which, with those enumerated, will be set forth in the following description of the preferred embodiment of my invention illustrated in the drawings accompanying and forming a part of the specification. It is to be understood that I do not limit myself to the showing made in the said drawing and description, but that I may adopt variations of the preferred embodiment within the scope of my invention as defined by the claims.

Referring to the drawings.

Figures 1, 2:
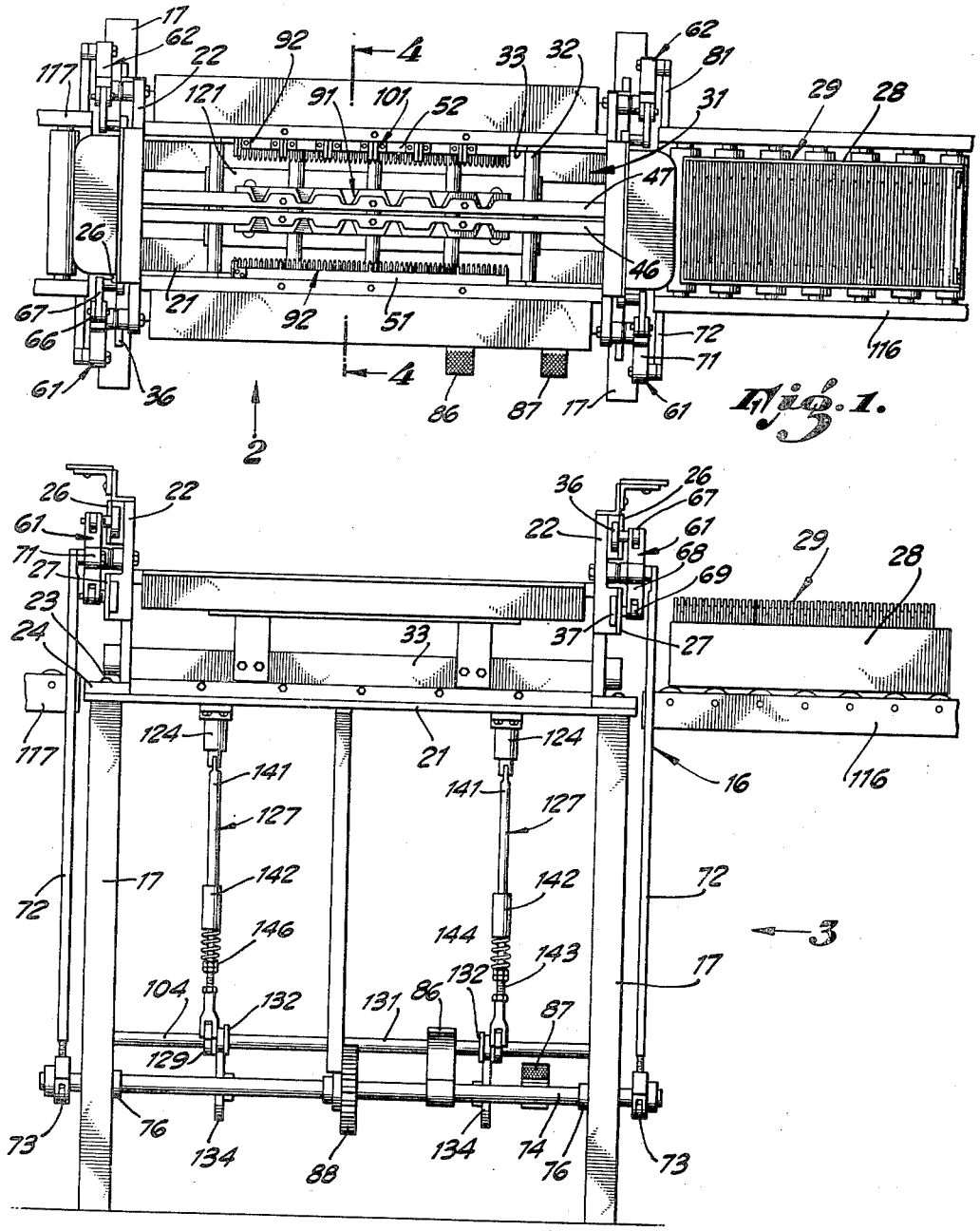
Figure 1 is a top plan view of a storage battery plate burning machine incorporating principles of the present invention.
Figure 2 is a view in front elevation, the direction of view being indicated by the arrow 2 of Figure 1.

The frame 16 of the machine used in performing the method of my invention comprises a pair of legs 17 at each end of the machine, the legs 17 of each pair being interconnected at their upper ends by a horizontal brace 18 from which the legs 17 diverge downwardly to increase the area of the machine's support. Another horizontal brace 19 rigidly interconnects the legs 17 of each pair a short distance above their lower ends. The pairs of legs are interconnected adjacent their upper ends by two spaced, horizontal plates 21; and an upstanding bracket 22 is rigidly secured adjacent each end of the machine as by means of machine screws or rivets 23 extending through the base flange 24 of each bracket 22 and into the associated horizontal plate 21.

Figure 6:
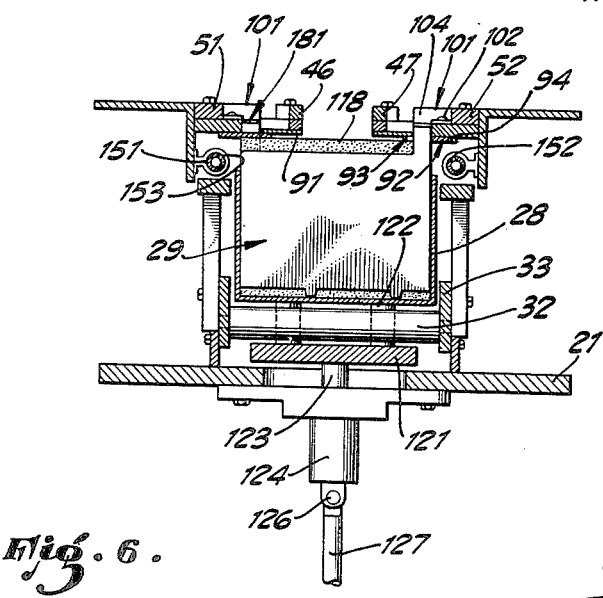
Figure 6 is a transverse, vertical sectional view taken upon the line 6—6 of Figure 5 with the direction of view as indicated.
Figure 8:
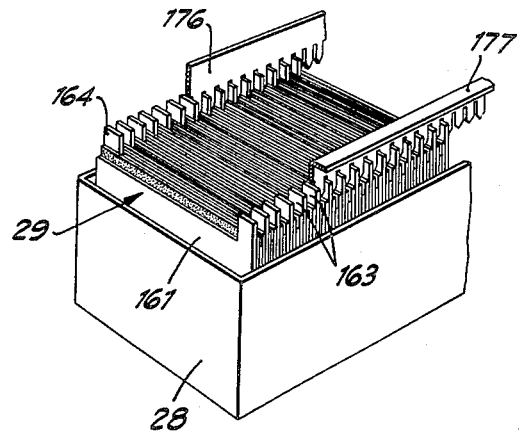
Figure 8 is a perspective view of a magazine carrying a supply of alternately-arranged positive and negative grid plates with separators interposed therebetween, predisposed in properly spaced-apart relation for reception into the burning machine, portions of the figure being broken away to reduce its size.
Figure 9:
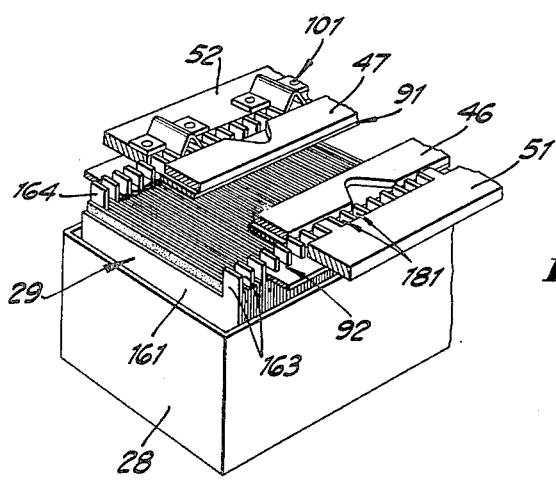
Figure 9 is a view similar to Figure 8 but indicating the manner in which the plates within the magazine are engaged by the burning racks which constitute an important element of the machine, while the burning process is carried out.

Each bracket 22 is provided with an upper pair 26 and a lower pair 27 of guideways, all of which are horizontally disposed, extending fore and aft with respect to the body of the machine i. e., in directions perpendicular to the direction in which magazines 28 filled with battery grid plates 29 and separators advance through the machine upon a roller conveyor 31, the rollers 32 of which are carried by longitudinally extending strips 33 extending upwardly from the horizontal plate 21 adjacent their inner edges, as best shown in Figure 6.

The guideways of the upper pair 26 of each bracket 22 are in alignment with each other as are also the guideways of the lower pair 27. A head 36 is slidably mounted for horizontal reciprocatory movement in each of the guideways of the upper pair 26 and, similarly, a head 37 is slidably mounted for horizontal reciprocatory movement in each of the guideways of the lower pair 27. An arm 38 extends downwards from the inner end of each of the upper heads 36 to which it is secured for vertical adjustment by means of a stud 39 rigid with the associated head 36 and extending through a slot 41 in the arm 38. A nut 42 threaded on the outer end of each stud 39, when tightened, clamps the arm 38 to its supporting head 36 for movement therewith and in selected position of vertical adjustment with respect thereto.

The lower ends of corresponding arms 38 at the two ends of the machine are interconnected by longitudinally extending rails 46 and 47, these two rails being disposed in a common horizontal plane, the rail 46 being nearer the front of the machine and the rail 47 nearer the back. Similarly, each of the reciprocating heads 37 of the lower pair of guideways 27 is provided with an upwardly extending arm 48 and corresponding arms 48 at opposite ends of the machine are interconnected by longitudinally extending rails 51 and 52 substantially in co-planar alignment with the rails 46 ad 47, the rail 51 being nearer the front of the machine and the rail 52 nearer the rear, with the rails 46 and 47 between the foremost and aftermost rails 51 and 52, respectively. This co-planar alignment of the four rails also is facilitated by the vertical adjustability of the rails 51 and 52 which may be accomplished by loosening nuts 53 threadedly engaged upon studs 54 rigid with the ends of the rails 51 and 52 and extending through vertical slots 56 in the upwardly extending arms 48.

Each of the end brackets 22 is provided with two T-shaped rocker arms 61 and 62, the former being pivotally mounted adjacent the front edge of the associated bracket 22 by means of a horizontal pivot pin 63 and the latter being similarly mounted adjacent the after edge of the associated bracket 22 by a horizontally disposed pivot pin 64. The upper branch 66 of the forward rocker arm 61 is operably connected to the head 36 which is slidably mounted in the forward guideway of the upper pair 26, this connection being accomplished by means of a connecting link 67 pivoted at its forward end to the branch 66 of the rocker arm and at its after end to the head 36. In a similar manner the lower branch 68 of the forward rocker arm 61 is connected by a link 69 to the head 37 which is slidably mounted in forward guideway of the lower pair 27. The third branch 71 of the forward rocker arm 61 extends forwardly from its central portion and is interconnected by means of a downwardly extending connecting rod 72, with a forwardly directed lever 73 rigidly mounted upon a longitudinally extending horizontal shaft 74 which is revolubly mounted in axially aligned bearings 76 carried by the two braces 19 at opposite ends of the machine. The parts are so proportioned and arranged that when the shaft 74 is rotated in a counter-clockwise direction, as viewed in Figure 3, the lever 73 pulls the connecting rod 72 downwards, causing the associated forward rocker arm 61 to rotate counter-clockwise. This draws the associated upper head 36 forward and moves the associated lower head 37 rearwardly; and inasmuch as the opposite end of the shaft 74 is provided with a similarly arranged lever 73' connected by a suitable connecting rod 72 to the corresponding forward rocker arm 61, turning the shaft 74 counter-clockwise effects simultaneous and co-extensive forward motion of the upper heads 36 adjacent the front of the machine and at both ends thereof, and, simultaneously therewith, co-extensive inward or rearward motion of the lower heads 37 adjacent the front of the machine at both ends thereof.

In a similar manner, each of the rocker arms 62 at the rear of the machine is connected by a connecting rod 81 with a rearwardly directed lever 82, both of these levers being carried by a second longitudinally extending shaft 83 journalled in bearings 84 rigidly mounted upon the two braces 19. Accordingly when the shaft 83 is rotated counter-clockwise, the connecting rods 81 are simultaneously pulled downwardly, rotating both rear rocker arms 62 in a counter-clockwise direction, and consequently effecting simultaneous and co-extensive rearward motion of the after upper heads 36 and forward or inward motion of the lower after heads 37. Each of the shafts 74 and 83 is provided with a pedal 86, 87, respectively, extending to a convenient location accessible to an operator located in the front of the machine, these pedals being so located that when the pedal 86 is depressed, the shaft 74 is rotated counter-clockwise and when the pedal 87 is depressed, the shaft 83 is rotated counter-clockwise. The two shafts 74 and 83 are operably interconnected by enmeshed gears 88 and 89 rigid with the shafts 74 and 83, respectively, thus causing both shafts to rotate simultaneously and co-extensively but in opposite directions when either shaft is turned.

Thus it may be seen that when the pedal 86 is depressed, rotating the shaft 74 counter-clockwise, the other shaft 83 rotates through an equal angular distance in a clockwise direction, causing all of the connecting rods 72 and 81 to be drawn downwards simultaneously. This causes all eight of the reciprocating heads 36 and 37 to move simultaneously, the upper heads 36 moving outwardly, i. e., the heads 36 associated with the front of the machine moving forwardly and the heads 36 associated with the rear of the machine moving rearwardly. At the same time the lower heads 37 move inwardly, i. e., the heads 37 associated with the front of the machine move rearwardly toward the center of the machine and the heads 37 associated with the rear of the machine move forwardly, also toward the center. When the other lever 87 is depressed, exactly the opposite motion of each of these several elements is effected. Therefore, when the pedal 86 is depressed, the two bars 46 and 51 are caused to move toward each other, as are also the two bars 47 and 52; and when the pedal 87 is depressed, the two bars 46 and 51 are moved apart as are also the two bars 47 and 52.

Figure 4:
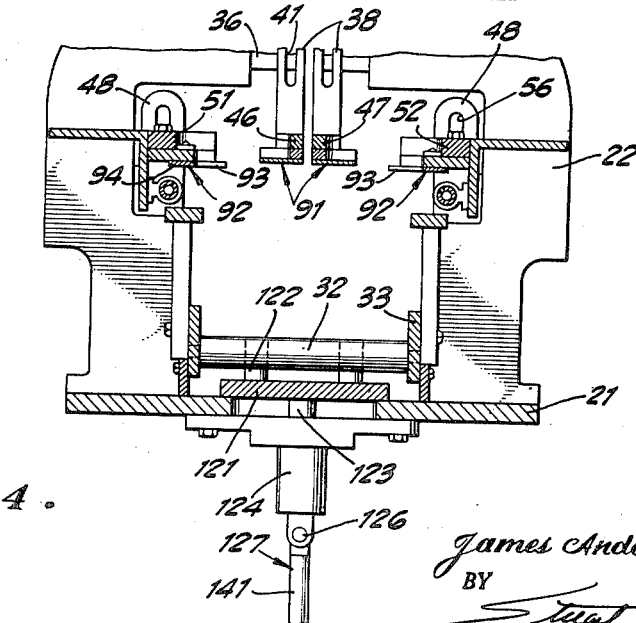
Figure 4 is an enlarged, transverse, vertical sectional view taken upon the line 4—4 of Figure 1 with the direction of view as indicated.
Figure 5:
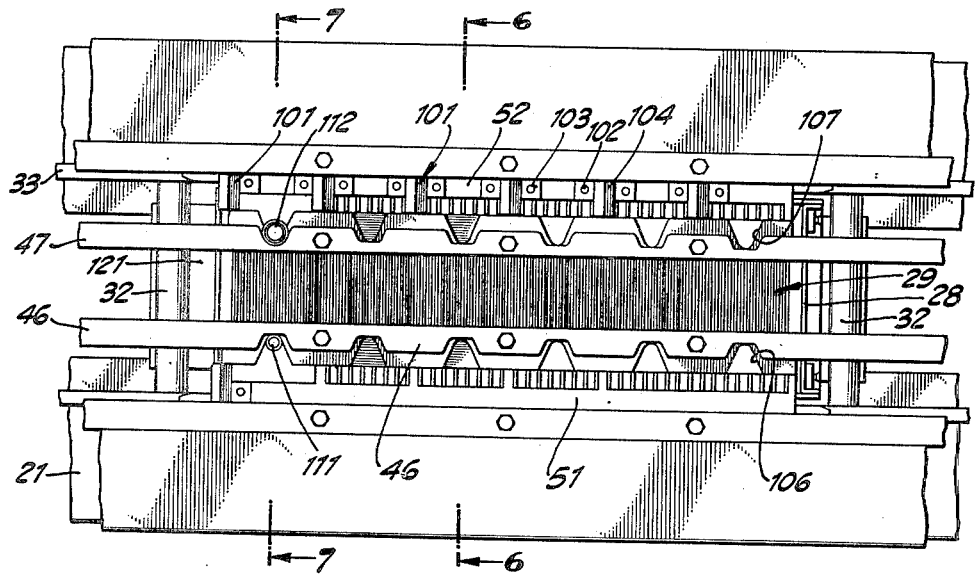
Figure 5 is an enlarged view in top plan of the burning machine of Figure 1, showing a magazine of battery grid plates and separators in position within the machine in readiness to be united into cell units. Portions of the figure are broken away to reduce its size.
Figure 7:
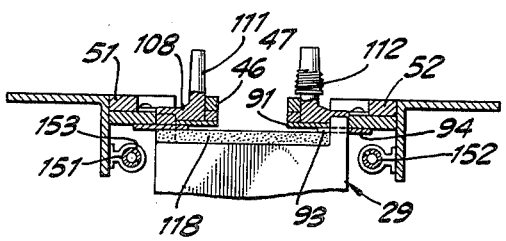
Figure 7 is a view similar to Figure 6, but taken upon the line 7—7 of Figure 5 with the direction of view as indicated and with portions of the figure broken away to reduce its size.

Each of the innermost longitudinally extending bars 46 and 47 is provided upon its under surface with a backing strip 91, that associated with the bar 46 extending forwardly therefrom while the strip 91 associated with the bar 47 extends rearwardly as best shown in Fig. 4. The outermost bars 51 and 52 are each provided with a comb structure 92, each of which comprises a plurality of teeth 93 extending horizontally from a comb back 94. The teeth 93 of the comb structure 92 carried by the front bar 51 extend rearwardly toward the backing strip 91, carried by the bar 46 but in a plane immediately therebelow so that when the two bars 46 and 51 are caused to move toward each other as hereinabove described, the ends of the teeth 93 associated with the bar 51 take positions immediately below the leading edge of the associated backing strip 91. In a similar manner the teeth 93 carried by the aftermost bar 52 extend forward toward the backing strip carried by the bar 47 but in a plane immediately therebelow so that when the bars 52 and 47 are moved toward each other the ends of these teeth take positions immediately below the leading edge of the backing strip 91 of the bar 47.

The teeth 93 of each of the comb structures 92 are of such width and are so spaced apart throughout the length of their associated supporting bars that the distance between corresponding portions of each two adjacent teeth is equal to the optimum spacing between corresponding portions of each two adjacent plates 29 of like polarity, of a conventional storage battery. Moreover, the teeth 93 of one of the comb structures 92 are directly opposite the spaces between teeth 93 of the other comb structure 92.

Spaced at predetermined and preferably equal distances throughout the length of one of the bars carrying a comb structure 92, say, for example, the bar 51 nearest the rear of the machine, is a series of shields 101 rigidly secured to the associated bar 51 as by cap screws 102 extending through laterally extending flanges 103 integral with the central portion 104 of the shield. The central portion 104 of each shield 101 is of inverted V-shaped cross-sectional form and extends beyond the after edge of its supporting bar 51, as best shown in Figure 6, and is sufficiently wide to completely cover one of the spaces between teeth 93 and, preferably, substantially half the width of each of the two teeth defining that space. The shields 101 are so spaced apart that they leave a number of uncovered inter-tooth spaces between each two adjacent shields, which corresponds to the required number of positive plates in the type of battery being produced. It should be explained here that when it is desired to alter the manufacturing set-up so as to produce storage batteries of a different ampere-hour capacity and therefore containing a different number of plates in each cell, the entire bar 51 may be removed and an alternative bar substituted therefor, similarly equipped with a comb structure 92 and with shields 101 but wherein the shields 101 are spaced at the proper distance to accommodate the variant number of inter-tooth spaces, which number corresponds to the desired number of positive plates in the batteries then to be produced.

Substantially V-shaped notches 106 and 107 are formed in the distal faces of the bars 46 and 47, respectively, i. e., these notches are formed in the bars 46 and 47 so that they open toward the respectively opposed bars 51 and 52. Each of these notches 106, 107 is adapted to receive the substantially triangular base portion 108 of the positive and negative terminal posts 111 and 112, respectively, it being understood that it is conventional practice to pre-cast these terminal posts and their bases in conventional form and size. The notches 106 therefore serve as a convenient means for accurately locating each of the several positive battery terminal posts 111 whereas the notches 107 locate the several negative terminal posts 112 as an aid to the machine's operator in placing those posts properly in position with respect to the grid plates 29 to which they are to be burned.

Figure 3:
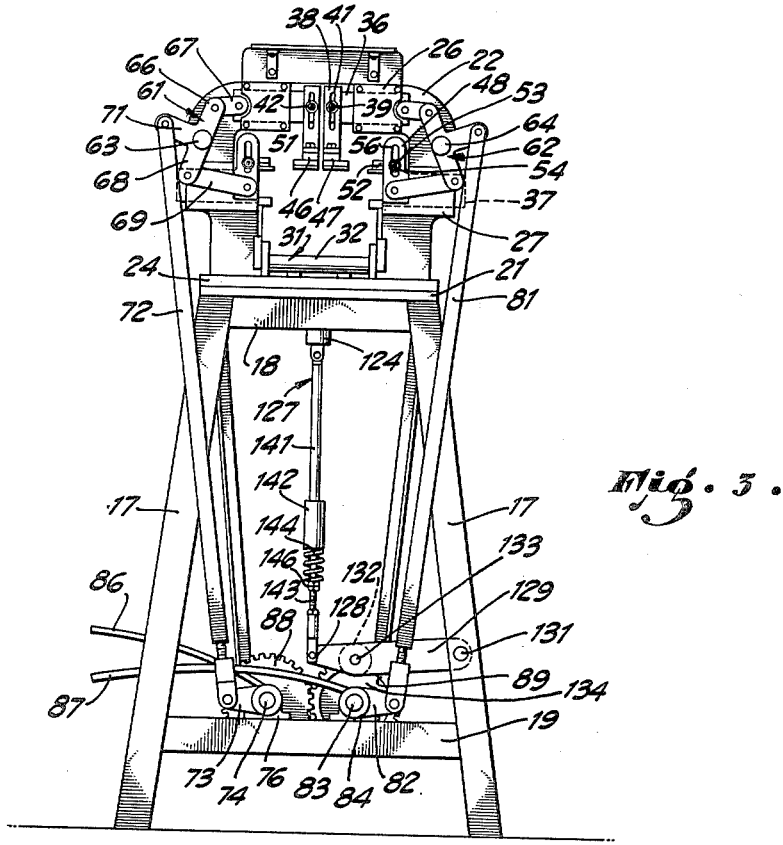
Figure 3 is an end elevation viewed from the right, as indicated by the arrow 3 of Figure 2.

Means, preferably in the nature of a roller conveyor 116 are provided for feeding loaded magazines 28 longitudinally into the machine; and a preferably similar conveyor 117 leads from the opposite end of the machine whereby to conduct the magazine 28 away from the machine after the grip plates 29 carried thereby have been burned together. Means also are provided for raising a magazine 28 while it is properly positioned within the machine so as to elevate it slightly above the rollers 32 and press the upper edges of the plate separators 118 which have previously been located between each two adjacent plates 29 firmly against the under surfaces of the teeth 93 of both comb structures 92, thereby assuring that the separators are located precisely in their proper positions with respect to their associated grid plates. This is of importance since it leaves only the thickness of the teeth 93 between the upper edges of the separators and the connecting straps, into which the separators might rise by floating in the electrolyte of the completed battery. Another advantage of my present burning machine therefore becomes apparent at this point, since by its use burning combs only .060 inch in thickness can be employed, in contrast to combs required by the hand burning process, which are in the order of ⅜ inch or ½ inch in thickness. This means for elevating the filled magazines preferably takes the form of a horizontally disposed platform 121 normally resting upon the upper surfaces of the horizontal bed plates 21 and disposed below the rollers 32. A plurality of pins 122 extend upwardly from the platform 121 between rollers 32 so that when the platform 121 is raised the pins engaging the under surface of the magazine 28 resting upon the rollers 32 elevate the magazine 28 and the plates 29 and separators 118 therein contained to the position illustrated in Figure 6. Rods 123 extending downwardly from the platform 121 through suitable guides 124 rigid with the bed plates 21 are pivotally connected as by horizontally disposed pins 126 to the upper ends of connecting rods 127. The lower end of each connecting rod 127 is pivotally connected as by horizontal pin 128 to one end of a transversely extending lever 129. The opposite end of each lever 129 is rotatably mounted upon a longitudinally extending rod 131 extending between the after legs 117 at opposite ends of the machine. Intermediate of the ends of the lever 129 a cam follower 132, preferably in the form of a roller, is journalled upon the horizontal pin 133, and each of these rollers is operably engaged upon the peripheral surface of a cam 134 which is also rigidly mounted upon the shaft 83. Consequently when the lever 86 is depressed, causing rotation of both shafts 74 and 83 and consequent rotation of the cams 134 out of their positions as illustrated in Figure 3, the lever 129 will be swung upwards, pushing the connecting rod 127 upwards and thereby elevating the platform 121 and a magazine full of plates and spacers as hereinabove indicated.

Preferably in order to prevent binding of the simultaneously operating portion of the machine, the connecting rod 127 is of compound structure, including an upper portion 141 having a socket 142 at its lower end, and a lower portion 143 in the form of a rod extending upwardly into the lower end of the socket 142. A coil spring 144 is under compression between the lower end of the socket 142 and an adjusting nut 146 threaded on the lower rod 143. Consequently, even though the stroke of the lower portion 143 caused by lifting the cam follower 132 is greater than the possible upward motion of a magazine 28, the spring 146 will absorb any such excess movement of the lower portion 143 without requiring more than the permissible length of stroke of the upper portion 141 of the connecting rod 127.

As an aid in preventing leakage of molten material past the teeth 93 as the burning process is being carried out, I prefer to provide means for cooling the teeth 93 and the adjacent portions of the apparatus. This cooling means conveniently takes the form of manifold tubes 151 and 152 extending longitudinally of the machine, preferably immediately below the front and back comb structures 92, respectively. Each of these manifold tubes, 151, 152 is provided with a plurality of nozzles which conveniently may take the form of orifices 153 in the walls of the tubes 151, 152 directed upwardly toward the under surfaces of the associated teeth 193. Means (not shown) are provided for supplying suitable cooling fluid, preferably air, under suitable pressure to both manifold tubes 151 and 152 so that the jets 153 direct the fluid upwardly into impingement with those portions of the apparatus which are subjected to the greatest quantity of heat.

Figure 10:
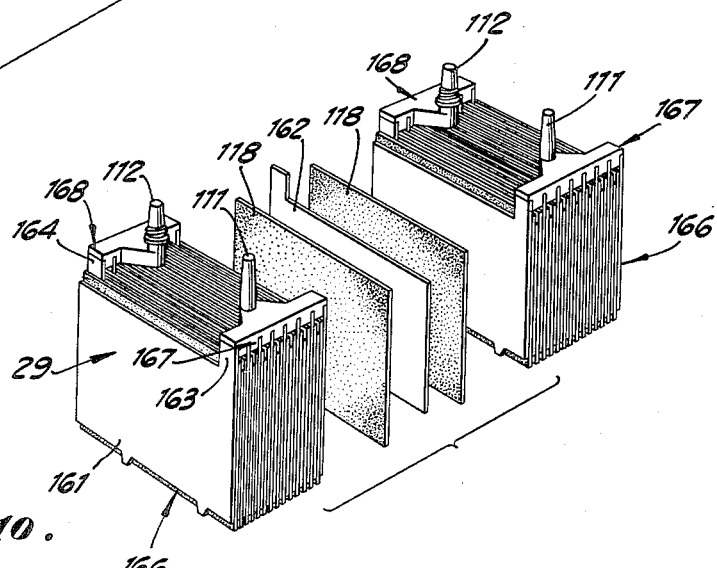
Figure 10 is a perspective view showing a pair of the storage battery cell units after grouping thereof within the machine of the present invention has been completed, and also showing the positive grid plates and associated spacers which are discarded as one of the valuable functions of my burning machine.

The method of my invention for assembling burning storage battery plates together into positive and negative plate assemblies suitably nested together to define storage battery cell units, which method in itself constitutes an important improvement over conventional methods, comprises first arranging the plates 29 to be assembled in proper relation with respect to each other and in proper numbers within the magazines 28. The plates 29 are arranged with positive plates 161 and negative plates 162 in alternation with each other, and with the tabs or lugs 163 of all of the positive plates 161 in a straight row adjacent one side of the magazine while all of the lugs 164 of the negative plates 162 in another straight row adjacent the other side of the magazine. Furthermore, a separator 118, preferably comprising a grooved sheet and a fiber glass retaining mat in accordance with conventional practice, is interposed between each two adjacent plates. In so filling the containers 28 there is no need of keeping tract of the number of positive and negative plate handles, the only requirement being to dispose the plates alternately and with the separator plates facing in the proper direction, as opposed to the requirements in more conventional practice which requires that the operator exercise care to assemble one extra negative plate in each cell unit so that the completed cell unit, as indicated at 166 in Figure 10, will consist of a negative plate assembly 167 containing a number of negative plates 162 which is greater by one than the number of positive plates 161 in the positive plate assembly 168.

This advantage of the present method arises from the fact that the shields 101 cover the lugs 163 of the positive plates which it is desired to leave unattached to either of the plate assemblies as the burning process is carried out so that thereafter these unattached positive plates 171 can readily be removed from between each two adjacent cell units 166, leaving the positive plate assembly 168 of each cell unit 166 with one less positive plate 161 than the number of negative plates 162 in the associated negative plate assembly 167.

The operator of the burning machine is not dependent upon the rate of operation of the personnel filling magazines 28 with battery grid plates 29 and separators. Rather, the filling personnel can operate at whatever rate is most economical, preferably accumulating a reserve supply of filled magazines ready to be taken through the burning machine at whatever rate of its operation is best. Before feeding each magazine 28 into the burning machine, the plates 29 preferably are pre-disposed in substantially the optimum spacing between plates by means of a pair of manually-operative combs 176 and 177, respectively, the teeth of which are spaced the same as the teeth 93 of my burning combs 92, and may be inserted between the lugs 168 of the positive plates 161 and between the lugs 164 of the negative plates respectively. This preliminary spacing of the plates 29 facilitates movement of the mechanically-actuated comb structures 92 so as to interpose their teeth 93 between the lugs of the plates after those plates have been moved into proper position by advancing a magazine 28 along the conveyor 116 and across the rollers 32. When a magazine 28 of plates 29 is so positioned within the machine, the operator is required only to depress the pedal 86, causing interposition of the teeth 93 between each two adjacent negative plate lugs 168 and between each two adjacent positive plate lugs 164. When the teeth 93 are so interposed and when the plates are pressed upwardly by operation of the elevating mechanism 134, 132, 127, etc., the plates will be firmly anchored in the proper position with respect to each other so that when they are burned together by melting solder, lead, or the like, into the channels 181 defined by the tongues 93 at the bottom, the inner faces of the supporting bars 51 and 52, respectively, and the outer faces of the backing strips' supporting bars 46 and 47, the plates will be permanently interconnected with a highly efficient mechanical and electrical binding, inasmuch as the lugs of the plates will be permanently embedded within and welded to the metal forming the interconnection upon freezing thereof.

After the molten metal has become solidified by freezing, the operator, by depressing the other pedal 87 effects withdrawal of the teeth 93 from between plates so that the lugs are all released and the magazine can easily be advanced along the rollers 32 onto the discharge conveyor 117 to any suitable location emptying the machine for advance thereinto of the next successive magazine 28 full of properly arranged plates 29.

I claim:

1. A machine for uniting electric storage battery plates into plate assemblies, said plates being disposed within a magazine and in parallel arrangement with their lugs in alignment, said machine comprising a frame, a pair of spaced parallel rails carried thereby, conveyor means for guiding said magazine into predetermined position with said lugs interposed between said rails, lug-spacing means movably mounted on said frame, and means operable to thrust said spacing means between said lugs and thereby dispose said plates in predetermined spaced-apart relation while certain of said lugs are united to group said plates into plate assemblies.

2. A machine for uniting electric storage battery plates into plate assemblies, said plates being disposed within a magizine and in parallel arrangement with their lugs in alignment, said machine comprising a frame, a pair of spaced parallel rails carried thereby, conveyor means for guiding said magazine into predetermined position with said lugs interposed between said rails, lug-spacing means movably mounted on said frame, means operable to thrust said spacing means between said lugs and thereby dispose said plates in predetermined spaced-apart relation while certain of said lugs are united to group said plates into plate assemblies, and means for shielding predetermined ones of said lugs whereby the plates associated with those lugs are left unattached to any of said assemblies.

3. A machine for uniting positive and negative storage battery plates into cell units, said positive and negative plates being disposed alternately within a magazine and in parallel arrangement with their lugs in two separate rows consisting, respectively, of positive plate lugs and negative plate lugs, said machine comprising a frame, two pairs of spaced parallel rails carried thereby, conveyor means for guiding said magazine into predetermined position with said lugs of each of said rows of lugs interposed between said rails of one of said pairs of rails, lug-spacing means associated with each of said rows and movably mounted upon said frame, and means operable to thrust both of said spacing means between the lugs of their respectively associated rows whereby said plates are disposed in predetermined spaced-apart relation while corresponding lugs are united to group the plates associated therewith into plate assemblies.

4. A machine for uniting positive and negative storage battery plates into cell units, said positive and negative plates being disposed alternately within a magazine and in parallel arrangement with their lugs in two separate rows consisting, respectively, of positive plate lugs and negative plate lugs, said machine comprising a frame, two pairs of spaced parallel rails carried thereby, conveyor means for guiding said magazine into predetermined position with said lugs of each of said rows of lugs interposed between said rails of one of said pairs of rails, lug-spacing means associated with each of said rows and movably mounted upon said frame, and means operable to thrust both of said spacing means between the lugs of their respectively associated rows whereby said plates are disposed in predetermined spaced-apart relation while corresponding lugs are united to group said positive plates into positive plate assemblies and said negative plates into negative plate assemblies with the plates of said positive plate assemblies interposed between the plates of said negative plate assemblies to present an assembled storage battery cell unit.

5. A machine for uniting positive and negative storage battery plates into cell units, said positive and negative plates being disposed alternately within a magazine and in parallel arrangement with their lugs in two separate rows consisting, respectively, of positive plate lugs and negative plate lugs, said machine comprising a frame, two pairs of spaced parallel rails carried thereby, conveyor means for guiding said magazine into predetermined position with said lugs of each of said rows of lugs interposed between said rails of one of said pairs of rails, lug-spacing means associated with each of said rows and movably mounted upon said frame, means operable to thrust both of said spacing means between the lugs of their respectively associated rows whereby said plates are disposed in predetermined spaced-apart relation while corresponding lugs are united to group said positive plates with positive plate assemblies and said negative plates into negative plate assemblies with the plates of said positive plate assemblies interposed between the plates of said negative plate assemblies to define assembled storage battery cell units, and means for shielding predetermined ones of said positive plate lugs whereby the positive plates associated therewith are left unattached to any of said assemblies.

6. A machine for uniting electric storage battery plates into plate assemblies, said plates being disposed within a magazine and in parallel arrangement with their lugs in a row, said machine comprising a frame, conveyor means thereon for guiding said magazine into predetermined position, a rail carried by said frame above and parallel to said conveyor means in position to engage one side edge of each of said lugs, a rail mounted on said frame for movement toward and away from said first-mentioned rail, means operable to move said movable rail toward the other of said rails and into engagement with the other side edges of said lugs, and a plurality of teeth projecting laterally from said movable rail toward said other rail in position to be thrust between said lugs when said movable rail is moved and thereby dispose said plates in predetermined spaced arrangement and to support molten material between said rails until said material solidifies with said lugs extending thereinto.

7. A machine for uniting electric storage battery plates into plate assemblies, said plates being disposed within a container and in parallel arrangement with their lugs in a row, said machine comprising a frame, conveyor means thereon for guiding said container into predetermined position, a rail carried by said frame above and parallel to said conveyor means in position to engage one side edge of each of said lugs, a rail mounted on said frame for movement toward and away from said first-mentioned rail, means operable to move said movable rail toward the other of said rails and into engagement with the other side edges of said lugs, a plurality of teeth projecting laterally from said movable rail toward said other rail in position to be thrust between said lugs and under a portion of said other rail when said movable rail is moved and thereby dispose said plates in predetermined spaced arrangement and to support molten material between said rails until said material solidifies with said lugs extending thereinto, means for forcing said container and said plates therein upwards to press said teeth against said portion of said other rail and thereby restrain leakage of said molten material, and means for cooling said tongues and the portions of said lugs below said tongues.

8. A machine for uniting electric storage battery plates into plate assemblies, said plates being disposed within a container and in parallel arrangement with their lugs in a row, said machine comprising a frame, conveyor means thereon for guiding said container into predetermined position, a rail carried by said frame above and parallel to said conveyor means in position to engage one side edge of each of said lugs, a rail mounted on said frame for movement toward and away from said first-mentioned rail, means operable to move said movable rail toward the other of said rails and into engagement with the other side edges of said lugs, a plurality of teeth projecting laterally from said movable rail toward said other rail in position to be thrust between said lugs and under a portion of said other rail when said movable rail is moved and thereby dispose said plates in predetermined spaced arrangement and to support molten material between said rails until said material solidifies with said lugs extending thereinto, means for forcing said container and said plates therein upwards to press said teeth against said portion of said other rail and thereby restrain leakage of said molten material, and means for jetting cooling fluid against said teeth between said lugs.

9. The method of making electric storage battery cell units which comprise loading into a magazine a number of positive and negative grid plates sufficient for a plurality of cell units with a separator between each two adjacent plates and with the lugs of said plates extending upward therefrom in two spaced rows with the lugs of said positive plates in one of said rows and the lugs of said negative plates in the other of said rows, thrusting a spacing tooth between each two adjacent lugs to space them a predetermined distance from each other, shielding selected ones of said lugs spaced at predetermined intervals throughout the load of plates within said magazine, and uniting the lugs of like polarity between each two adjacent shielded lugs into an integrally joined plate assembly while its plates are disposed between plates of a cell assembly of opposite polarity to define an assembled cell unit between each two adjacent shielded plates.

JAMES ANDERSON, Jr.

REFERENCES CITED

The following references are of record in the file of this patent:

UNITED STATES PATENTS

| Number | Name | Date |
|---|---|---|
| 1,932,136 | Hole | Oct. 24, 1933 |
| 1,960,195 | Nyce | May 22, 1934 |